US 7,890,943 B2

(12) United States Patent
Guo et al.

(10) Patent No.: US 7,890,943 B2
(45) Date of Patent: Feb. 15, 2011

(54) CODE OPTIMIZATION BASED ON LOOP STRUCTURES

(75) Inventors: Xiaofeng Guo, Shanghai (CN); Jinquan Dai, Shanghai (CN); Long Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 991 days.

(21) Appl. No.: 11/731,431

(22) Filed: Mar. 30, 2007

(65) Prior Publication Data

US 2008/0244512 A1    Oct. 2, 2008

(51) Int. Cl.
*G06F 9/44* (2006.01)
(52) U.S. Cl. ........................................ 717/160
(58) Field of Classification Search ................ 717/160, 717/151
See application file for complete search history.

(56) References Cited

U.S. PATENT DOCUMENTS 6,732,356 B1 * 5/2004 Chen ........................... 717/156

| | | | |
|---|---|---|---|
| 2003/0079209 A1 * | 4/2003 | Sinha | 717/150 |
| 2005/0108695 A1 * | 5/2005 | Li et al. | 717/144 |
| 2006/0155932 A1 * | 7/2006 | Rasche et al. | 711/125 |
| 2006/0230393 A1 * | 10/2006 | Doh et al. | 717/137 |

OTHER PUBLICATIONS

Pending U.S. Appl. No. 10/582,427, filed Jun. 8, 2006, Inventor: X. Guo et al.
Pending U.S. Appl. No. 10/582,204, filed Jun. 8, 2006, Inventor: X. Guo et al.
Pending U.S. Appl. No. 11/648,334, filed Jun. 8, 2006, Inventor: X. Guo et al.
Pending PCT Application No. PCT/CN2005/002307 filed Dec. 24, 2005, Inventor: P. Li et al.

* cited by examiner

*Primary Examiner*—Philip Wang
(74) *Attorney, Agent, or Firm*—D'Ann Naylor Rifai

(57) ABSTRACT

Instructions that have no dependence constraint between them and other instructions in a loop of a critical section may be moved out of the critical section so that the size of the critical section may be reduced. A flow graph of a program including the critical section may be generated, which includes loops. The flow graph may be transformed based on which any unnecessary instructions in loops may be moved out of the critical section. Subsequently, the original flow graph of the critical section may be recovered from the transformed flow graph.

11 Claims, 8 Drawing Sheets

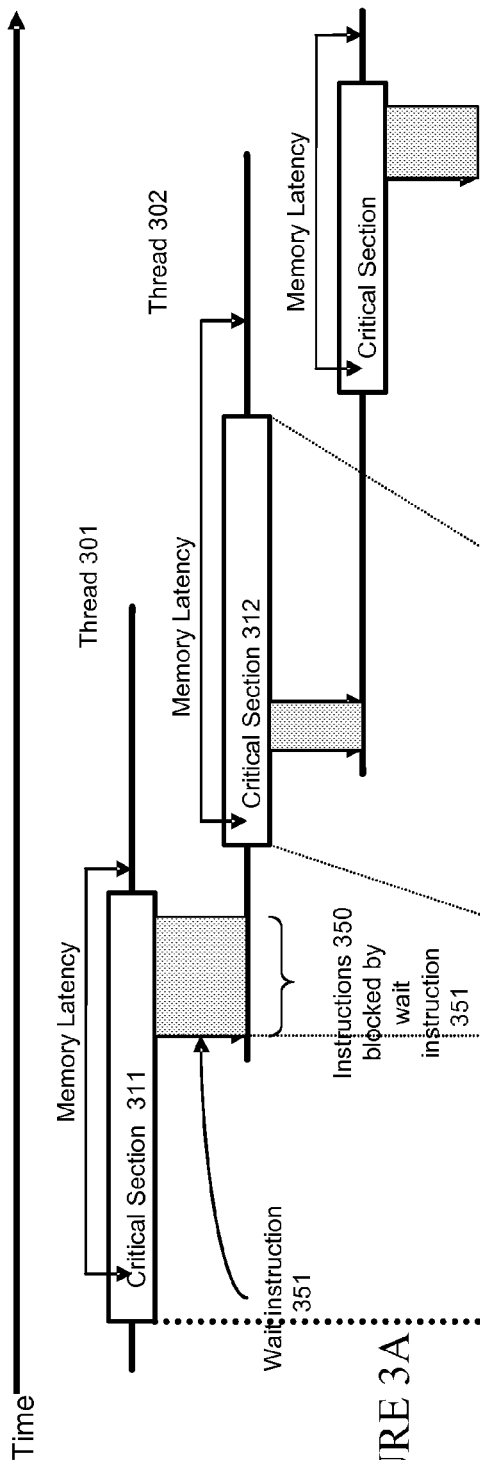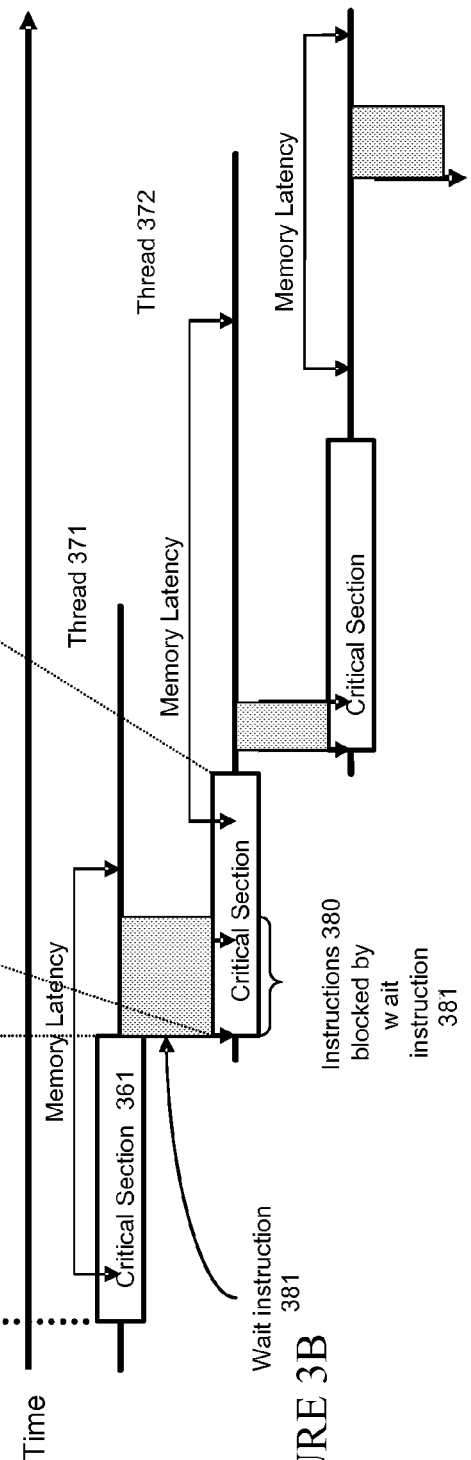
FIGURE 3A
FIGURE 3B

CODE OPTIMIZATION BASED ON LOOP STRUCTURES

RELATED APPLICATION

This application is related to commonly assigned U.S. application Ser. No. 10/582,427, filed by Xiaofeng Guo, Jinquan Dai, Long Li, and Zhiyuan Lv with an effective filing date of Nov. 17, 2005 and entitled "Latency Hiding of Traces Using Block Coloring."

BACKGROUND

1. Field

This disclosure relates generally to compiling technologies in a computing system, and more specifically but not exclusively, to code optimization techniques based on loop structures.

2. Description

Multithreading and multiprocessing are common programming techniques often used to maximize the efficiency of computer programs by providing a tool to permit concurrency or multitasking. Threads are ways for a computer program to be divided into multiple and distinct sequences of programming instructions where each sequence is treated as a single task and to be processed simultaneously.

One example application that may use the multithreaded programming technique is a packet-switched network application that processes network packets in a high speed packet-switched system concurrently. To maintain and organize the different packets, a new thread may be created for each incoming packet. In a single processor environment, the processor may divide its time between different threads. In a multiprocessor environment, different threads may be processed on different processors. For example, the Intel® IXA™ network processors (IXPs) have multiple microengines (MEs) processing network packets in parallel where each ME supports multiple threads.

In such a parallel programming paradigm, accesses to shared resources, including shared memory, global variables, shared pipes, and so on, are typically be protected by critical sections to ensure mutual exclusiveness and synchronizations between threads. Normally, critical sections are created by using a signal mechanism in a multiprocessor system. A signal may be used to permit entering or to indicate exiting of a critical section. For instance, in an Intel® IXP™, packets are distributed to a chain of threads in order (i.e., an earlier thread in the chain processes an earlier packet). Each thread waits for a signal from the previous thread before entering the critical section. After the signal is received, the thread executes the critical section code exclusively. Once this thread is done, it sends the signal to the next thread after leaving the critical section.

It is well-known that multithreading technologies may be used to hide memory access latency (or some other shared resource access latency). However, critical sections may sometimes prevent memory access latency from being hidden by multithreading technologies. Code motion techniques may be used to at least partly solve this problem caused by critical sections by moving some instructions out of critical sections so that the size of critical sections may be reduced. When loops are present in a critical section, complex code flow structures introduced by loops may make it harder to move instructions out of the critical section. Thus, it is desirable to have new code motion techniques that can work effectively for critical sections with loops.

BRIEF DESCRIPTION OF THE DRAWINGS

The features and advantages of the disclosed subject matter will become apparent from the following detailed description of the subject matter in which:

FIGS. 3A and 3B illustrate an example of moving instructions outside of a critical section to shorten the critical section;

DETAILED DESCRIPTION

According to embodiments of the subject matter disclosed in this application, instructions unrelated to a critical section with loops may be moved out of the critical section so that the size of the critical section may be reduced. A flow graph of a program including the critical section may be generated, which includes loops. The flow graph may be transformed based on which any unrelated instructions may be moved out of loops. Once instruction motion is done, the original flow graph of the program may be recovered from the transformed flow graph.

Reference in the specification to "one embodiment" or "an embodiment" of the disclosed subject matter means that a particular feature, structure or characteristic described in connection with the embodiment is included in at least one embodiment of the disclosed subject matter. Thus, the appearances of the phrase "in one embodiment" appearing in various places throughout the specification are not necessarily all referring to the same embodiment.

Figure 1:
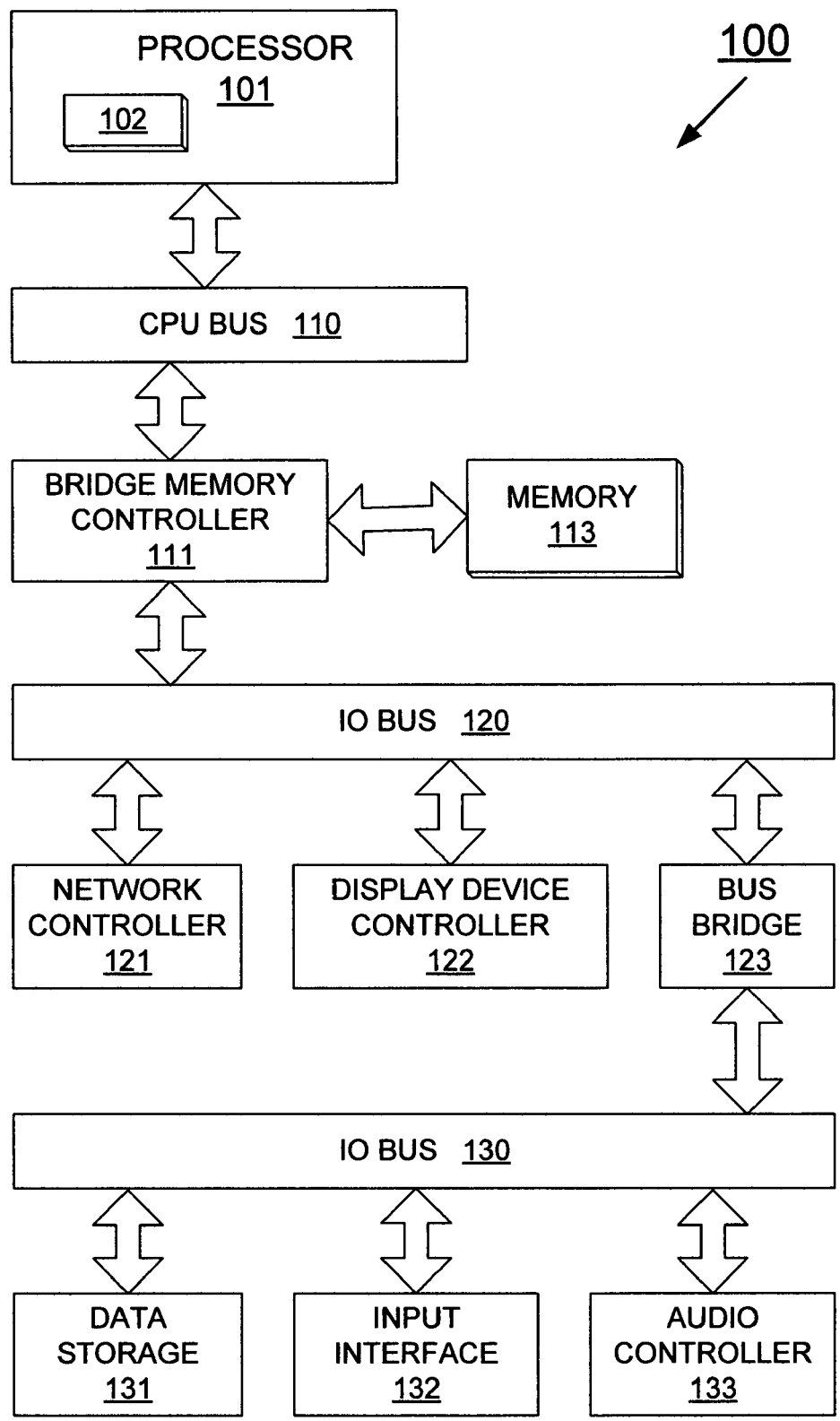
FIG. 1 is a block diagram of an exemplary computing system in which an example embodiment of the subject matter disclosed in the present application may be implemented.

FIG. 1 is a block diagram of an exemplary computing system 100 in which an example embodiment of the subject matter disclosed in the present application may be implemented. The computing system 100 includes a processor 101 that processes data and a memory 113. The processor 101 may have multiple or many processing cores (for brevity of description, term "multiple cores" will be used hereinafter to include both multiple processing cores and many processing cores). The processor 101 may be a complex instruction set microprocessor, a reduced instruction set computing microprocessor, a very long instruction word computer microprocessor, a processor implementing a combination of instruction sets, or other processor device. FIG. 1 shows the computing system 100 with a single processor. However, it is understood that the computing system 100 may operate with multiple processors. Additionally, each of the one or more processors may support one or more hardware threads. The processor 101 is coupled to a CPU (Central Processing Unit) bus 110 that transmits data signals between processor 101 and other components in the computing system 100.

The memory 113 may be a dynamic random access memory ("DRAM") device, a static random access memory ("SRAM") device, read-only memory ("ROM"), a synchronous DRAM ("SDRAM") device, a Double Data Rate ("DDR") SDRAM device, and/or other memory device. The memory 113 may store instructions and code represented by data signals that may be executed by the processor 101. According to an embodiment of the computing system 100, a compiler may be stored in the memory 113 and implemented by the processor 101 in the computing system 100. According to an embodiment of the subject matter disclosed in this application, the compiler may transform the flow graph of a program including a critical section. The program includes at least one loop. After transformation, any loop that has multiple entries or exits may have a single block acting as an entry or exit. Based on the transformed flow graph, instructions unrelated to the critical section may be moved out of the critical section so that the size of the critical section may be reduced. Subsequently, the original flow graph of the program may be recovered from the transformed flow graph.

A cache 102 may reside inside processor 101 to store data stored in memory 113. The cache 102 speeds access to memory by the processor 101 by taking advantage of its locality of access. In an alternative embodiment of the computing system 100, the cache 102 may reside external to the processor 101. In another embodiment, the cache 102 may include multiple levels, such as level 1 cache (L1 cache), level 2 cache (L2 cache), level 3 cache, and so on, with one or more levels (e.g., L1 cache) residing inside the processor 101 and others residing outside the processor 101. A bridge memory controller 111 directs data signals between the processor 101, the memory 113, and other components in the computing system 100 and bridges the data signals between the CPU bus 110, the memory 113, and a first IO (Input/Output) bus 120.

The first IO bus 120 may be a single bus or a combination of multiple buses. The first IO bus 120 provides communication links between components in the computer system 100. A network controller 121 may be coupled to the first IO bus 120. The network controller 121 may link the computing system 100 to a network of computers (not shown) and support communication among the computers. A display device controller 122 may be coupled to the first IO bus 120. The display device controller 122 allows coupling of a display device (not shown) to the computing system 100 and acts as an interface between the display device and the computing system 100.

A second IO bus 130 may be a single bus or a combination of multiple buses. The second IO bus 130 may provide communication links between components in the computing system 100. A data storage device 131 is coupled to the second IO bus 130. The data storage device 131 may be hard disk drive, a floppy disk drive, a compact disc ("CD") ROM device, a flash memory device or other mass storage device. An input interface 132 may be coupled to the second IO bus 130. The input interface 132 may be, for example, a keyboard and/or mouse controller to other input interface. The input interface 132 may be a dedicated device or can reside in another device such as a bus controller or other controller. The input interface 132 allows coupling of an input device to the computing system 100 and transmits data signals from an input device to the computing system 100. An audio controller 133 may be coupled to the second IO bus 130. The audio controller 133 operates to coordinate the recording and playing of sounds by a device such as an audio codec which is also coupled to the IO bus 130. A bus bridge 123 couples the first IO bus 120 and the second IO bus 130. The bus bridge 123 operates to buffer and bridge data signals between the first IO bus 120 and the second IO bus 130.

When a program is executed in the computing system 100, it may be executed in multiple threads. In one embodiment, all of the threads may be running on processor 101. In another embodiment, threads may be distributed and run on multiple processor or processing cores. Threads communicate to other threads through shared resources such as global memory, registers, or signals. In many instances, the shared resource may only be accessed by one thread. Such an exclusive access of the shared resource by one thread at a time may be implemented by using a critical section. A conventional method to implement a critical section is to use a signal mechanism. A thread may enter a critical section after receiving a signal and exiting the critical section by notifying the next thread that it is done and by passing a signal to the next thread.

Figure 2:
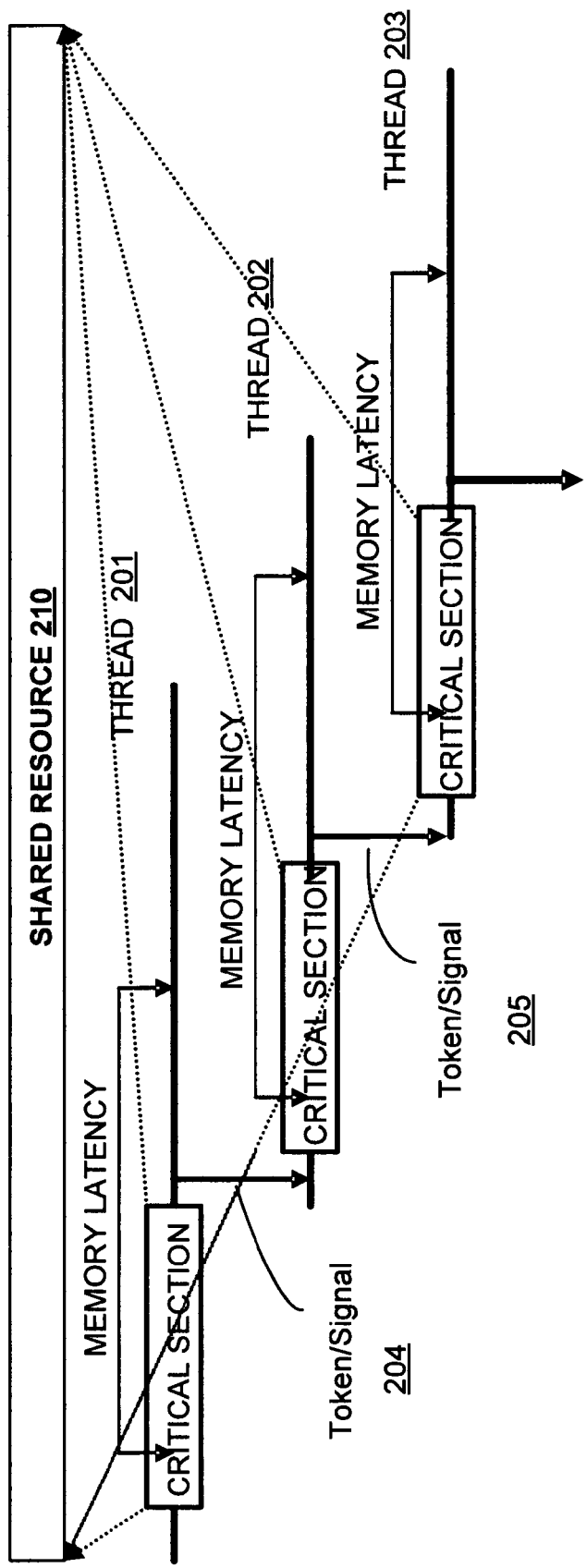
FIG. 2 illustrates an example of signal-based critical sections.

FIG. 2 illustrates an example of signal-based critical sections. A thread 202 waits for a token or signal 204 from a previous thread 201. After accessing its critical section, the thread 202 then passes a token or signal 205 to a thread 203. Before the thread 203 receives the token or signal 205, the thread 202 has exclusive access to a shared resource 210.

Typically it takes time to access the shared resource. This time is referred to as resource access latency, which is measured between the instant when resource access (e.g., memory access) is initiated and the instant when the accessed data in the resource is effective. If resource access latency is included in a critical section, the processor or processing core executing the thread that has entered this critical section will be idle during this latency period. This results in inefficient use of computing power. One way to improve the efficiency of a computing system running multiple threads is to hide resource access latency or overlap resource access latency in one thread with resource access latency and/or other computations in other threads.

FIGS. 3A and 3B illustrate an example of moving instructions outside of a critical section to shorten the critical section according to an example embodiment of the subject matter disclosed in the present application. In a token or signal based critical section described in FIG. 2, thread 302 may wait until thread 301 exits a critical section 311 before thread 302 may begin to execute its instructions in a critical section 312. A shaded block 350 represents the instructions blocked by a wait instruction 351. Since the wait instruction 351 already blocks all the subsequent instructions in 350, the instructions in 350 may be moved outside of the critical section 311 and not affecting the sequence in which the instructions may be executed.

When the wait instruction 351 is moved outside of the critical section 311, the critical section 311 may be shortened. As depicted in FIG. 3B, a critical section 361 is shorter than the critical section 311 depicted in FIG. 3A. As a result, thread 371 may release the critical section 361 to thread 372 sooner than thread 301 releases the critical section 311 to thread 302. In this embodiment of the invention, the wait instruction 351 is moved to a location indicated by 381 and the instructions blocked by the wait instructions, 350, are moved to a location indicated by 380. When critical sections are shortened as much as they may be shortened, a multithreaded program may be executed efficiently.

However, when loops are present in a critical section, or loops are intertwined with the critical section, resulting in a more complex flow graph of the critical section, moving wait and/or other unnecessary instructions become more difficult.

In such situations, the flow graph with loops may be transformed to facilitate instruction motion out of the loop and out of the critical section, according to an embodiment of the subject matter disclosed in the present application.

Figure 4:
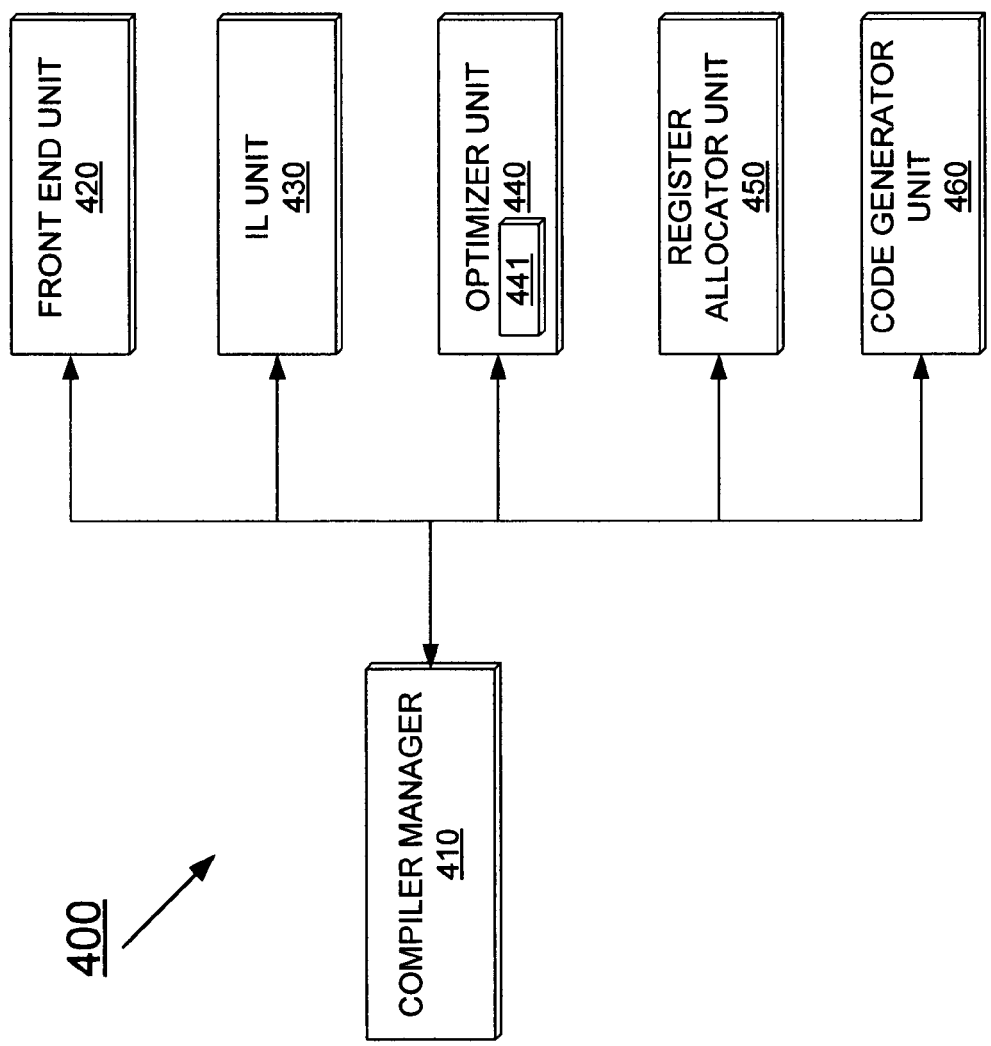
FIG. 4 is a block diagram that illustrates a compiler according to an example embodiment of the subject matter disclosed in the present application.

FIG. 4 is a block diagram that illustrates a compiler 400 that may include a code motion apparatus, according to an example embodiment of the subject matter disclosed in the present application. The compiler 400 may include a compiler manager 410. The compiler manager 410 receives source code to compile. The compiler manager 410 interfaces with and transmits information between other components in the compiler 400.

The compiler 400 may include a front end unit 420. According to an embodiment of the compiler 400, the front end unit 420 operates to parse source code and convert it to an abstract syntax tree. The compiler 400 may also include an intermediate language ("IL") unit 430. The IL unit 430 transforms the abstract syntax tree into a common intermediate form such as an intermediate representation. It should be appreciated that the IL unit 430 may transform the abstract syntax tree into one or more common intermediate forms.

The compiler may include an optimizer unit 440. The optimizer unit 440 may utilize one or more optimization procedures to optimize the intermediate representation of the code. According to an embodiment of the compiler 440, the optimizer unit 440 may perform peephole, local, loop, global, interprocedural and/or other optimizations. According to an embodiment of the compiler 440, the optimizer unit 440 includes a code motion apparatus 441. The code motion apparatus may transform the flow graph of a program that includes a critical section. The critical section includes or intertwines with at least one loop. After transformation, any loop that has multiple entries or exits may have a single block acting as an entry or exit. The transformed flow graph makes code motion through loops easier than does the original flow graph. Based on the transformed flow graph, the code motion apparatus 441 may move instructions unrelated to the critical section out of the critical section so that the size of the critical section may be reduced. Subsequently, the code motion apparatus 441 may recover the original flow graph of the program from the transformed flow graph.

The compiler 400 may include a register allocator unit 450. The register allocator unit 450 identifies data in the intermediate representation that may be stored in registers in the processor rather than in memory. Additionally, the compiler 400 may include a code generator 460. The code generator 460 converts the intermediate representation into machine or assembly code.

Figure 5:
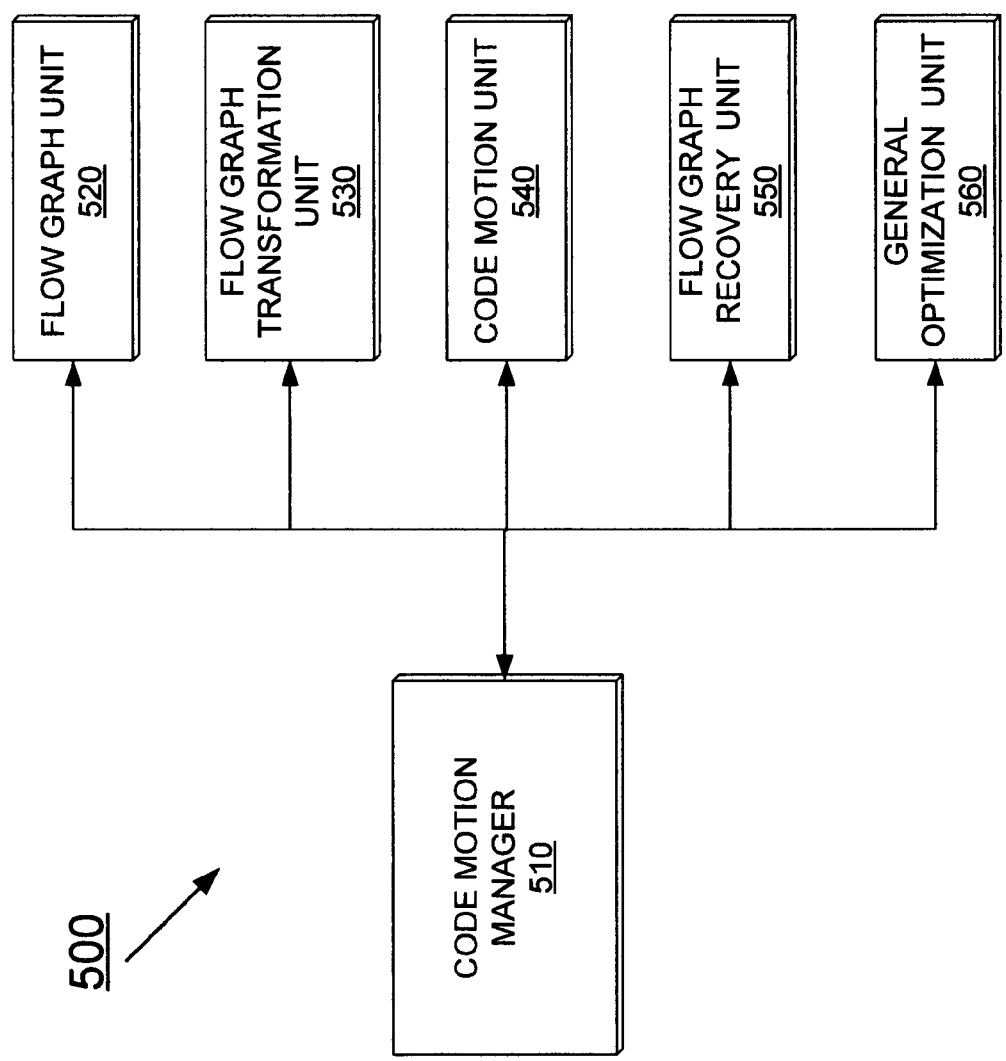
FIG. 5 is a block diagram of an exemplary code motion apparatus according to an example embodiment of the subject matter disclosed in the present application.

FIG. 5 is a block diagram of an exemplary code motion apparatus 500 according to an example embodiment of the subject matter disclosed in the present application. The code motion apparatus 500 may be used to implement the code motion apparatus 441 shown in FIG. 4. The code motion apparatus 500 includes a code motion manager 510. The code motion manager 510 interfaces with and transmits information between other components in the code motion apparatus 500.

Code motion apparatus 500 may include a flow graph unit 520. The flow graph unit 520 may receive a program having a critical section. The critical section may include or intertwined with loops. The flow graph unit may generate a flow graph for the program.

Code motion apparatus 500 also includes a flow graph transformation unit 530 to transform the flow graph generated by flow graph unit 520. In one embodiment, a process for transforming the flow graph as shown in the following pseudo code may be used:

```
/* start Pseudo Code 1 */
Input: FG - flow graph
Output:FG - flow graph
         loop_inout_pairs - (in, out) is a block pair for a loop.
do DFS for identifying loops on graph FG, results listed below:
    B2L[i] : map i --> loop B2L[i],
    Loops : loop set;
for (edge (i,j) in graph FG)
{
    if (B2L[i] == 0 && B2L[j] != 0)
        loop_entry[B2L[j]] += (i, j); // i is an entry of loop B2L[j]
    if (B2L[i] != 0 && B2L[j] == 0)
        loop_exit[B2L[i]] += (i, j); // j is an exit of loop B2L[i]
}
for (component i)
{
    if (Cardinality(loop_entry[i]) > 1)
    {
        int number = 0;
        add block core into graph FG;
        for (edge (i, j) in loop_entry[i])
        {
            number ++;
            add block nb into graph FG;
            insert instruction (key<-number) at the end of block i;
            remove edge (i, j);
            add edge (i, core), (core, nb) and (nb, j);
        }
        insert instruction (switch(key) ...) into block core;
        in <- core;
    }
    else
    {
        // unused loop must have been removed.
        assert(Cardinality(loop_entry[i]) > 0);
        in <- i; // edge (i, j) is the only element of loop_entry[i];
    }
    if (Cardinality(loop_exit[i]) > 1)
    {
        int number = 0;
        add block core into graph FG;
        for (edge (j, i) in loop_exit[i])
        {
            number ++;
            add block nb into graph FG;
            remove edge (j, i);
            add edge (j, nb), (nb, core) and (core, i);
            insert instruction (key<-number) into block nb;
        }
        insert instruction (switch(key) ...) into block core;
        out <- core;
    }
    else
    {
        assert(Cardinality(loop_exit[i]) > 0);
        out <- j; // edge (j, i) is the only element in loop_exit[i];
    }
    insert (in, out) into loop_inout_pairs;
}
/*end Pseudo Code 1 */
```

Pseudo Code 1 is self-explanatory to a person of ordinary skills in the art. In general, one time depth-first search ("DFS") is used in the transformation process illustrated by Pseudo Code 1. The DFS identifies the outmost loop in a critical section or a program including a critical section. The transformation may identify entries and exits of loops in the critical section or the program concerned. After applying the transformation process, any loop that has multiple entries and/or exits will end up with a single block acting as an entry or exit.

Figure 6B:
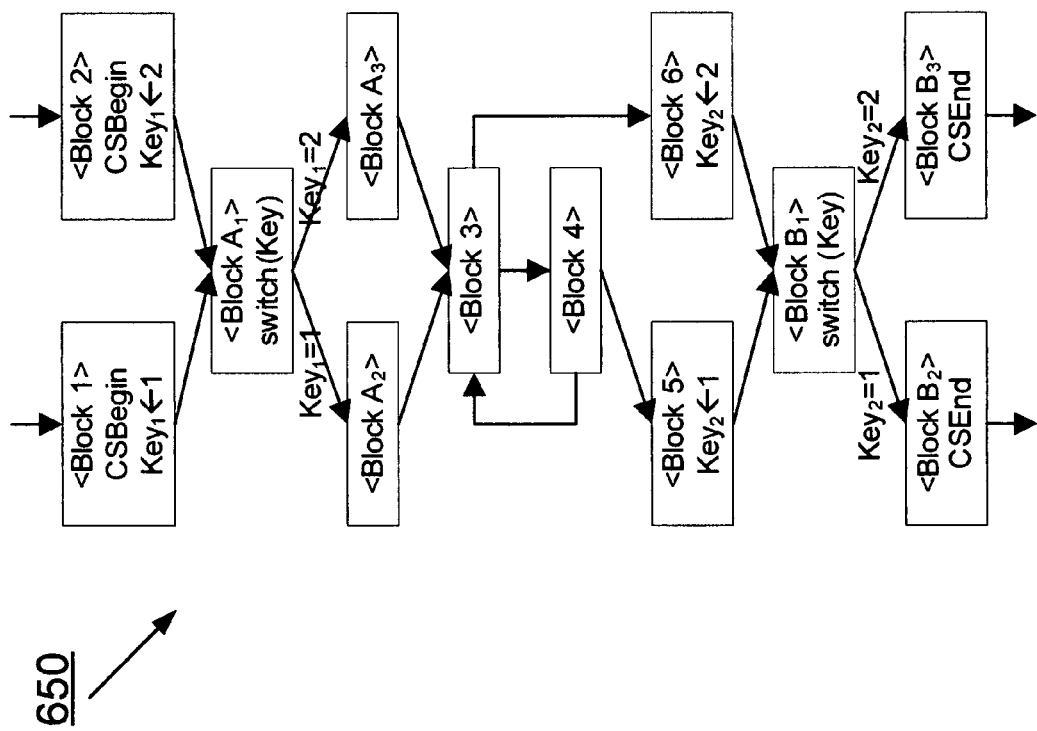
FIGS. 6A and 6B illustrate an example flow graph and its corresponding transformed flow graph of a program according to an example embodiment of the subject matter disclosed in the present application.
Figure 6A:
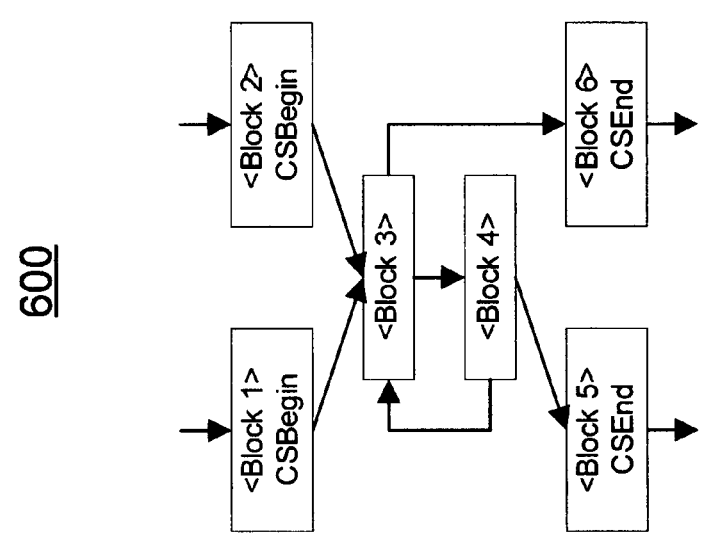

FIG. 6A illustrates an example flow graph 600 of a program including a critical section. As illustrated, the critical section has a loop (e.g., block 3 and block 4) and has two entries and two exits. FIG. 6B illustrates a transformed flow graph 650 using the transformation process illustrated by Pseudo Code 1. In the transformed flow graph 650, Block $A_1$ and Block $B_1$ are added to act as the only entry and exit, respectively, to the loop. In order to adding these two blocks, additional blocks (e.g., Block $A_2$, Block $A_3$, Block $B_2$ and Block $B_3$) may also need to be added.

Returning now to FIG. 5, code motion apparatus 500 also includes a code motion unit 540 to move unnecessary instructions and/or wait instructions out of the critical section based on the transformed flow graph generated by flow graph transformation unit 530. Those unnecessary instructions and/or wait instructions are identified by checking dependence constraint between them and other instructions in a loop. If there is no dependence constraint between an instruction and other instruction in the loop, this instruction may be moved out of the loop and out of the critical section. An example process for code motion is illustrated by Pseudo Code 2 below:

```
/* Start Pseudo Code 2 */
// do code hoisting on block b;
do traditional code motion;
if ((x, b) is in loop_inout_pairs)
{
   included_blocks <- blocks between x and b;
   compute all Put/Get/Read/Write in included_blocks;
   if ((instruction i is a motion candidate in block b)
      and (i does not depend on any instruction in included_blocks))
   {
      move i from b to x;
   }
}
   /* End Pseudo Code 2 */
```

Pseudo Code 2 is self-explanatory to a person of ordinary skills in the art. It should be noted that other processes may also be used for code motion.

Figure 7C:
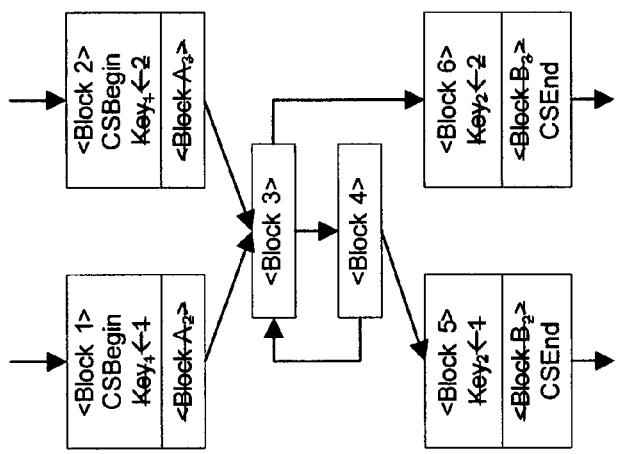
FIGS. 7A, 7B, and 7C illustrate a process for recovering original flow graph from a transformed flow graph, according to an example embodiment of the subject matter disclosed in the present application.
Figure 7B:
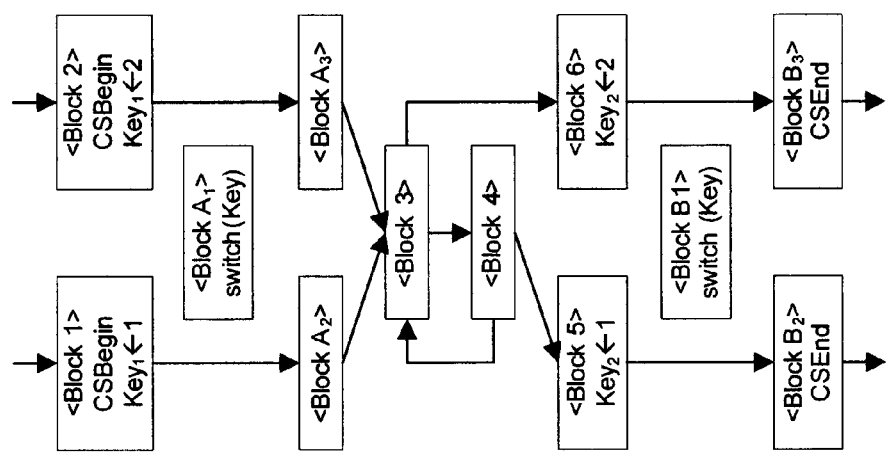
Figure 7A:
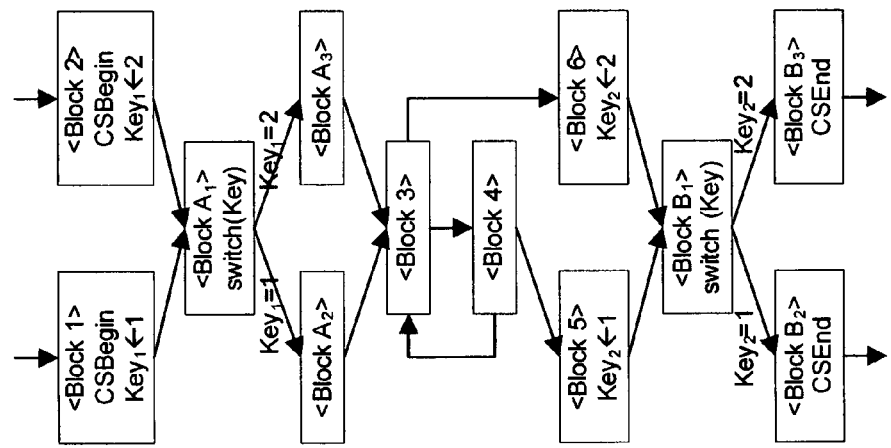

Code motion apparatus 500 also includes a flow graph recovery unit 550 to recover the original flow graph after unnecessary instructions and/or wait instructions are moved out of the critical section by code motion unit 540. There may be a variety of approaches to recover the flow graph. In one embodiment, the flow graph may be recovered based on saved information during the flow graph transformation. For example, all added blocks and edges may be removed from the transformed flow graph and all removed edges may be recovered from the transformed flow graph. In another embodiment, flow graph optimization may be used to recover the original flow graph from the transformed flow graph. FIGS. 7A, 7B, and 7C illustrate a process for recovering original flow graph from a transformed flow graph through flow graph optimization. FIG. 7A shows the transformed flow graph (as shown as FIG. 6B also). In FIG. 7B, Block $A_1$ and Block $B_1$ are removed from the transformed flow graph as redundant blocks. In FIG. 7C, certain blocks are combined, for example, Block 1 and Block $A_2$ are combined, and unnecessary instructions are removed from the combined blocks (e.g., $Key_1 \leftarrow 1$).

Code motion apparatus may also include a general optimization unit 560. The general optimization unit 560 applies general optimization methods such as code scheduling and copy optimizations to hide resource access latency. The commonly assigned U.S. patent application Ser. No. 10/582,427 entitled "Latency Hiding of Traces Using Block Coloring," filed by Xiaofeng Guo, Jinquan Dai, Long Li, and Zhiyuan Lv with an effective filing date of Nov. 17, 2005 describes several approaches to optimize code so that resource access latencies may be hid. This patent application is incorporated by reference herein.

Figure 8:
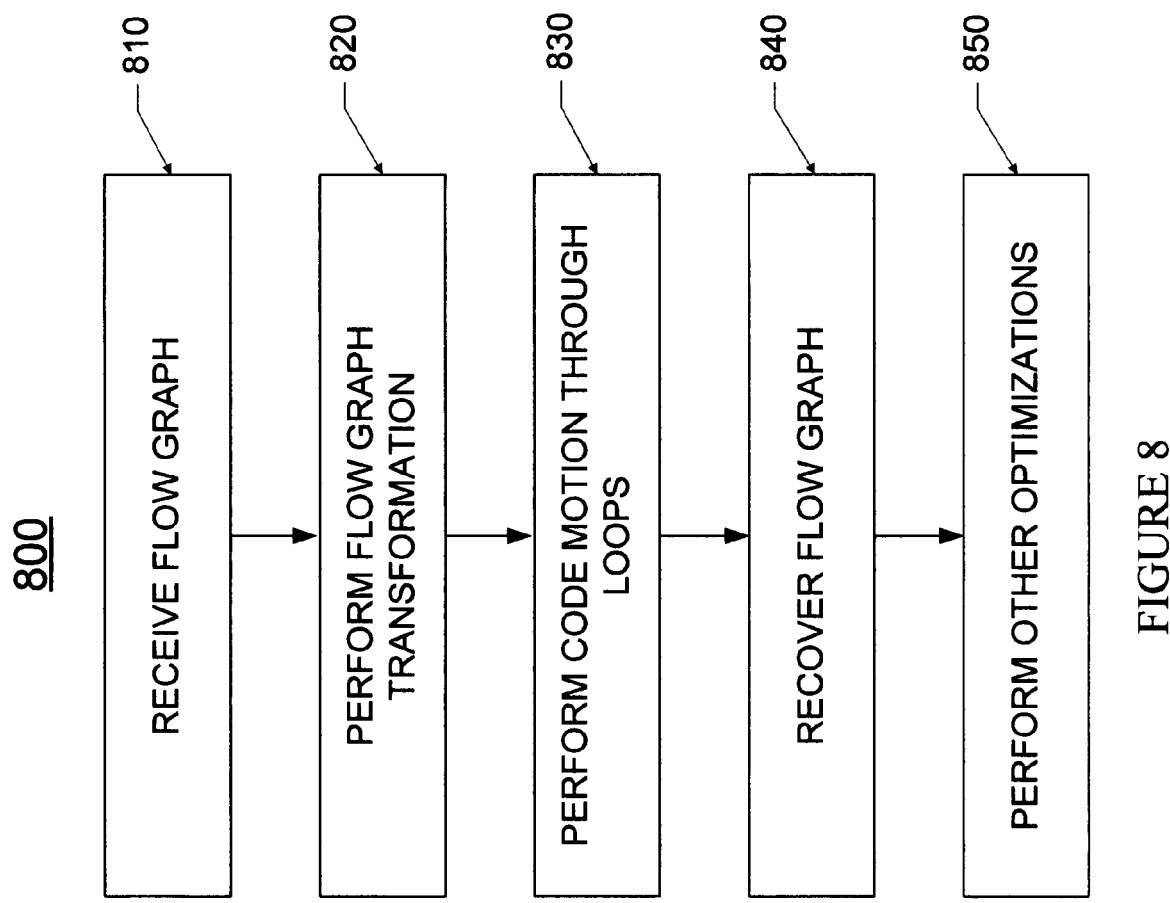
FIG. 8 is a flowchart of one example process for code motion based on loop structures according to an example embodiment of the subject matter disclosed in the present application.

FIG. 8 is a flowchart of one example process 800 for code motion based on loop structures according to an example embodiment of the subject matter disclosed in the present application. At block 810, a flow graph of a program including a critical section may be received. At block 820, the flow graph received at block 810 may be transformed to identify all loops in the critical section, to identify entries and exits of all the identified loops, and to transform any loop with multiple entries and/or exits with a loop with a single entry and exit. At block 830, instructions with no dependence constraints between them and other instructions in any loop may be identified and moved out of the critical section. At block 840, the flow graph received at block 810 may be recovered from the transformed flow graph. At block 850, other optimizations may be performed, which may further hide shared resource access latency and/or make the critical section more efficient.

Although an example embodiment of the disclosed subject matter is described with reference to block and flow diagrams in FIGS. 1-8, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An article comprising a non-transitory machine-readable medium that contains instructions, which when executed by a processing platform, cause said processing platform to perform operations for compiling programming code, the operations including:
   identifying a critical section in the code;
   generating a flow graph for the code including the identified critical section;
   performing flow graph transformation for the flow graph;
   moving unnecessary instructions out of the critical section based on the transformed flow graph; and
   recovering the flow graph from the transformed flow graph after the unnecessary instructions are moved out of the critical section, wherein recovering the flow graph comprises using information saved during flow graph transformation to remove blocks and edges added by the flow graph transformation to the flow graph and to recover edges removed by the flow graph transformation.

2. The article of claim 1, wherein recovering the flow graph comprises applying a flow graph optimization approach to the transformed flow graph to recover the flow graph.

3. The article of claim 1, wherein performing flow graph transformation comprises:
   identifying loops in the critical section;
   identifying entries and exits of the loops; and
   transforming a loop with multiple entries and/or exits to a loop with a single entry and a single exit.

4. The article of claim 3, wherein identifying loops in the critical section comprises applying depth-first search to the critical section.

5. The article of claim 1, wherein the unnecessary instructions comprise instructions which have no dependence constraint with other instructions in the critical section.

6. The article of claim 1, further comprising applying a latency sensitive optimization approach to the code to hide resource access latency.

7. A system comprising:
   a processor; and
   a memory comprising instructions for a compiler, wherein the compiler executes on the processor, and the compiler comprises:
      a front end unit to parse source code and to covert the source code to an abstract syntax tree;
      an intermediate language unit to transform the abstract syntax tree into an intermediate representation;
      an optimizer unit to optimize the intermediate representation of the source code, the optimizer unit having a code motion apparatus to identify a critical section in the source code, to generate a flow graph for the source code, to transform the flow graph, and to move unnecessary instructions out of the critical section based on the transformed flow graph;
      a flow graph unit to generate the flow graph for the source code including the identified critical section;
      a flow graph transformation unit to transform the generated flow graph, wherein the flow graph transformation unit identifies loops in the critical section, identifies entries and exits of the loops, and transforms a loop with multiple entries and/or exits to a loop with a single entry and a single exit; and
   a code motion unit to move the unnecessary instructions out of the identified critical section based on the transformed flow graph.

8. The system of claim 7, wherein the code motion unit further comprises a flow graph recovery unit to recover the flow graph from the transformed flow graph after the unnecessary instructions are moved out of the critical section.

9. The system of claim 8, wherein the flow graph recovery unit applies a flow graph optimization approach to the transformed flow graph to recover the flow graph.

10. The system of claim 7, wherein the flow graph transformation unit applies depth-first search to the critical section to identify the loops in the critical section.

11. The system of claim 7, wherein the unnecessary instructions comprise instructions which have no dependence constraint with other instructions in the critical section.

* * * * *